United States Patent [19]
Bauer et al.

[11] 4,161,877
[45] Jul. 24, 1979

[54] METHOD FOR THE DETERMINATION OF THE AXIAL THRUST OF ROLLER BEARINGS

[75] Inventors: Heinrich F. Bauer, Eichenau; Gerhard Helbling, Munich; Florian Hildebrandt, Günding, all of Fed. Rep. of Germany

[73] Assignee: Motoren-und Turbinen-Union München GmbH, Munich, Fed. Rep. of Germany

[21] Appl. No.: 832,291

[22] Filed: Sep. 12, 1977

[30] Foreign Application Priority Data
Sep. 18, 1976 [DE] Fed. Rep. of Germany ....... 2642080

[51] Int. Cl.² .............................................. G01L 5/12
[52] U.S. Cl. ........................................ 73/140; 73/593
[58] Field of Search .......................... 73/140, 581, 593

[56] References Cited
U.S. PATENT DOCUMENTS

| | | | |
|---|---|---|---|
| 2,787,905 | 4/1957 | Prestipino et al. | 73/593 |
| 2,796,759 | 6/1957 | Baugh et al. | 73/593 |
| 3,287,966 | 11/1966 | Haan et al. | 73/140 |
| 3,952,566 | 4/1976 | Jacobson | 73/593 |

*Primary Examiner*—Charles A. Ruehl
*Attorney, Agent, or Firm*—Scully, Scott, Murphy & Presser

[57] ABSTRACT

A method for the determination of the axial thrust of roller bearings under extreme operating conditions, which includes determining the variation in the rotational speed of the bearing cage, and employing the obtained value as a measure for calculating the axial thrust. The method employs sensors, such as strain gauge strips, applied to a stationary portion of the bearing to obtain the cage rotational speed through the dynamic deflection of a bearing weak point formed in that portion of the bearing.

3 Claims, 5 Drawing Figures

VIEW A

METHOD FOR THE DETERMINATION OF THE AXIAL THRUST OF ROLLER BEARINGS

BACKGROUND OF THE INVENTION

1. Field of the Invention

The present invention relates to a method for the determination, under extreme operating conditions, of the axial thrust of ball or roller bearings which are adapted to that purpose.

2. Discussion of the Prior Art

Currently known methods for the measurement of the axial displacement may be divided into two groups:

1. Measuring methods in which the sensors are applied on the rotating shaft. These require a free shaft end for attachment of the rotation transmitter and are generally quite limited in running time and maximum rotational speed. The signals of the sensors, almost always, consist of a mixture of axial thrust or displacement, torsional moment and deflection, which must then be separated by means of special circuits or during the evaluation thereof.

2. Measuring methods in which an elastic intermediate element which is equipped with sensors is located between the outer bearing housing and the supporting structure. The measuring element, most frequently a plate spring-shaped or shaft ring-type intermediate member, requires a predetermined extent of axial displacement for the bearing housing for measurement take-off and, as in the case of presently marketed measuring support discs, requires a relatively large amount of additional space. Distinct hysteresis appearances are, in general, connected with the displacement of the outer housing.

SUMMARY OF THE INVENTION

Accordingly, it is an object of the present invention to avoid the disadvantages encountered in presently known methods and, even under difficult operating conditions, for instance at high temperatures and rotational speeds, to be able to determine axial thrusts with the utilization of conventional sensors.

In order to attain the foregoing object, in accordance with the invention there is to be determined the change in the rotational speed of the bearing cage, and this value is then employed as the measured magnitude for the axial thrust.

For different types of roller bearing constructions, the actual roll paths of the roll bodies vary quite significantly in dependence upon the rotational speed and axial thrust. Under the assumption of kinematically satisfactory operating conditions, a determinate minimum axial thrust must facilitate a rolling of the roll bodies free of slippage, the relationship between the cage rotational speed and shaft rotational speed, or a similarly formed characteristic magnitude, formulates a measure for the axial thrust.

In an advantageous manner, pursuant to the invention, there may be rapidly obtained the cage rotational speed from the frequency of the dynamic deflection at a weak point in the material of the roller bearing component which is stationary during operation at roll body over-roll through the interposition of sensors, preferably strain gauge strips.

This method is particularly well suited for difficult operating conditions, such as high oil temperature, impingement of drops on the measuring location, and strong vortex flows in the bearing chamber, so as to be extensively free from disruptions as a pure frequency measurement. In accordance with the inventive method, the dynamic component of the axial thrust occurs as a function of the frequency modulation of the roll body over-roll or rolling over frequency.

BRIEF DESCRIPTION OF THE DRAWINGS

The invention is now described in detail hereinbelow, taken in conjunction with the accompanying drawings; in which.

DETAILED DESCRIPTION

Figure 1:
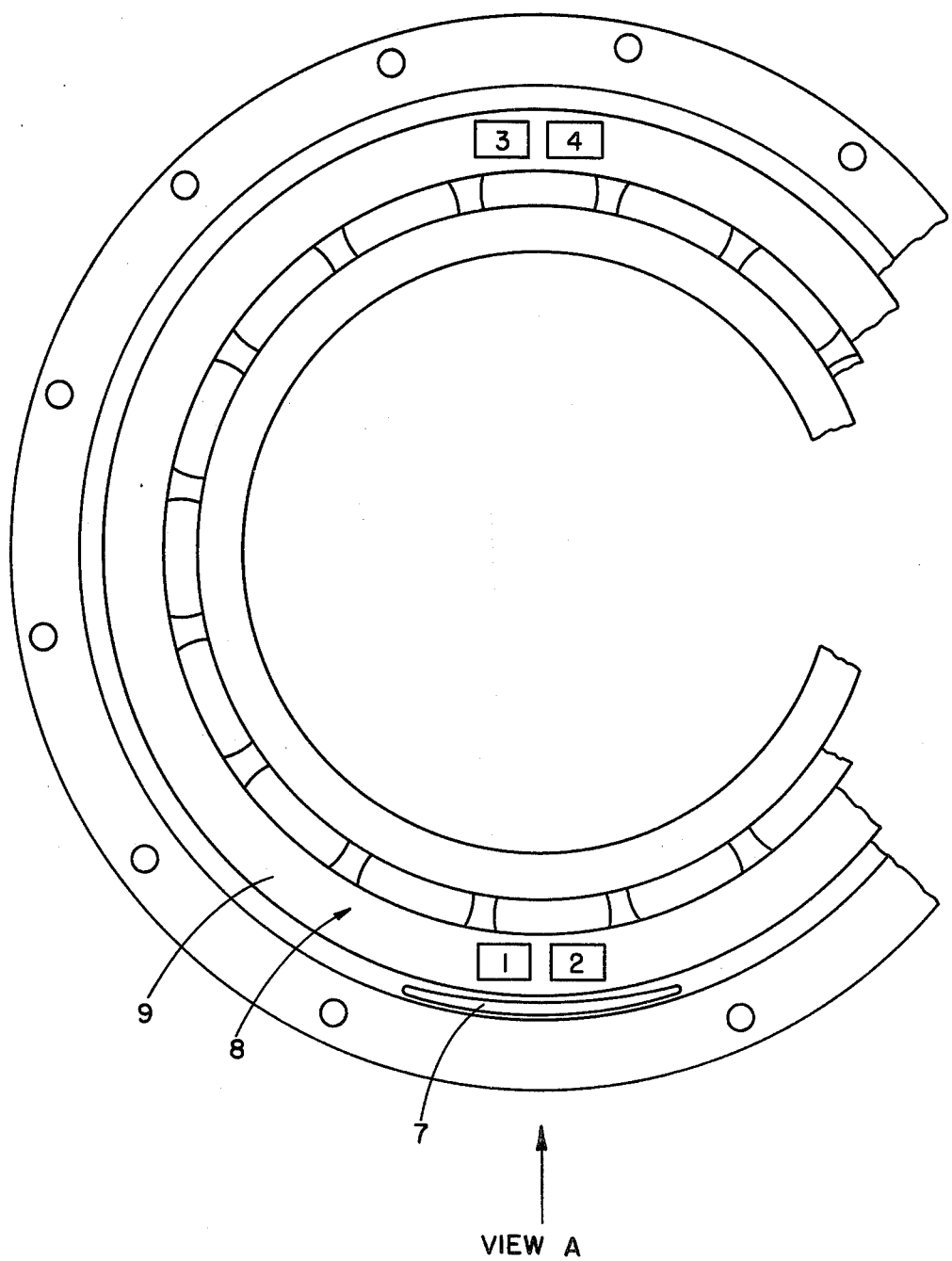
FIG. 1 shows a front view of a roller bearing constructed in a cup shape, which illustrates the position of the strain gauge strips and the position of the one-sided recess provided in the support sleeve.
Figure 2:
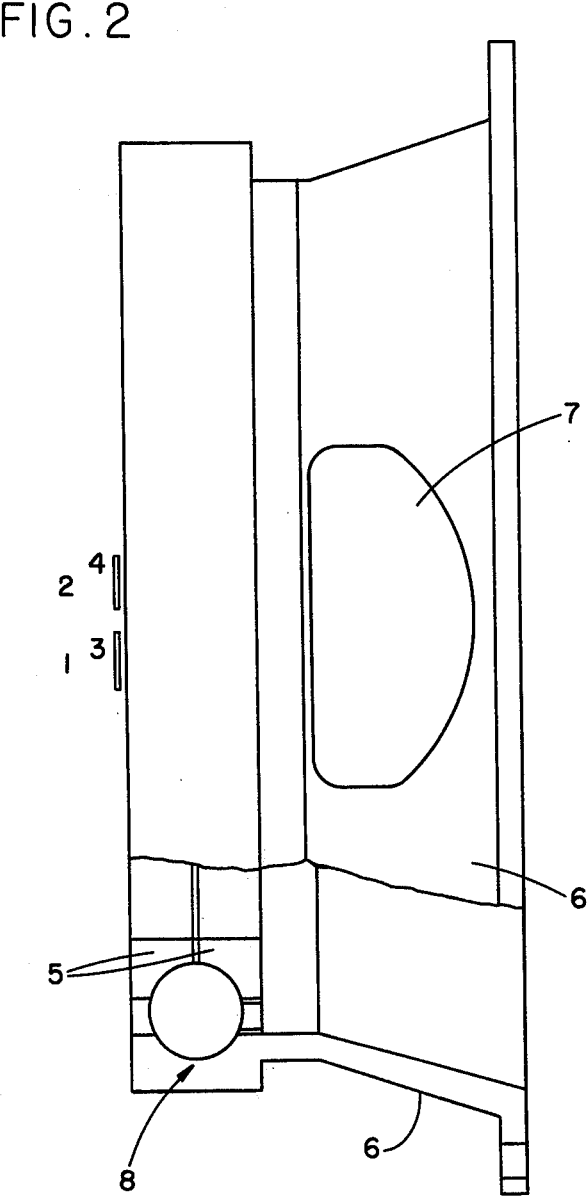
FIG. 2 shows the roller bearing construction, partly in section, in the direction of view A in FIG. 1.

FIGS. 1 and 2 of the drawings illustrate a roller bearing adapted for carrying out of the invention, including a flange-mountable, cup-shaped support member or cone 6 containing the outer bearing ring 8. The weak point is formed by a cutout 7 in one side of the support member 6.

Figure 3:
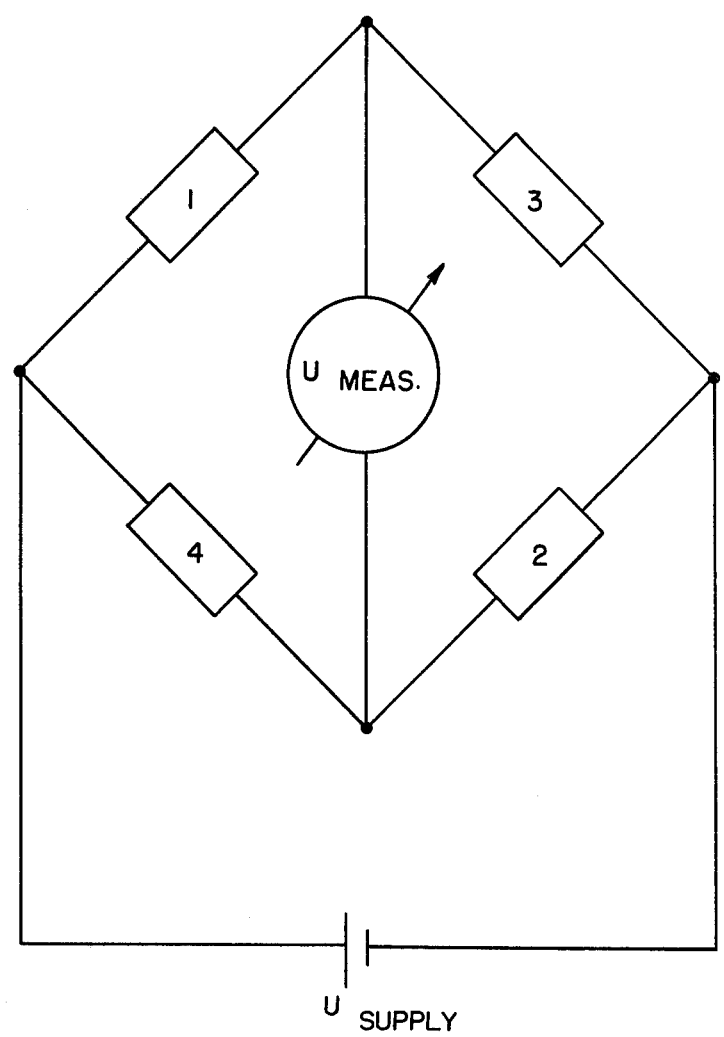
FIG. 3 shows a full bridge circuit associated with the roller bearing of FIGS. 1 and 2.

In order to be able to measure the relative cage rotational speed as a measure for the absolute thrust through the frequency of the dynamic deflection at the cutout 7 during the roll bodies over-roll, the roller bearing of FIGS. 1 and 2 has associated therewith, for example, a strain gauge strip-electrical full bridge having a high temperature resistance, as shown in FIG. 3, whose active sensors 1, 2 mounted on the end surface (front end surface 9 in FIG. 1) on the median diameter of the outer bearing ring 8, in the circumferential direction median of the cutout 7, and precisely oppositely thereof there are mounted the compensating strips 3, 4, considering an even number or roll bodies, on the median diameter of the outer bearing ring 8.

For an odd number of roll bodies, respectively, ball bearings, the compensating strips are displaced by a one-half ball spacing.

In lieu of the full-bridge circuit for the active sensors, respectively compensating strips selected in accordance with the embodiment of FIG. 3, it is contemplatable that the sensors can be arranged in quarter- or half-bridge circuits.

Figure 4:
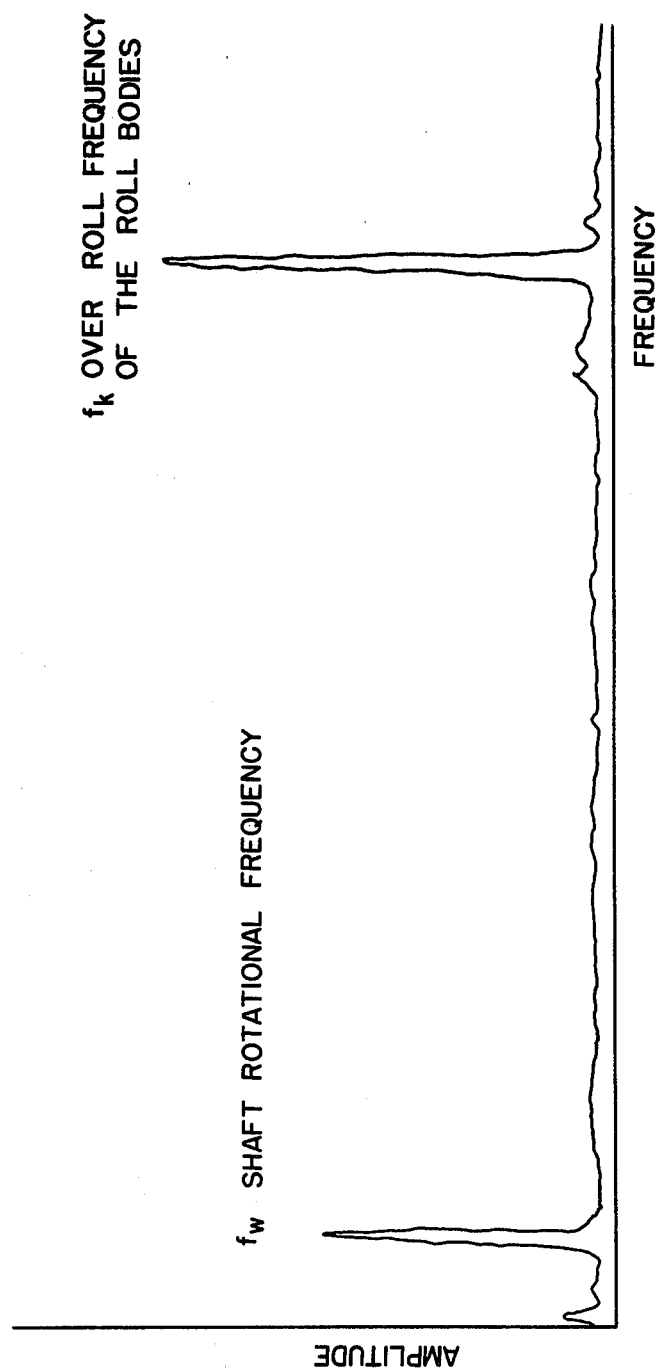
FIG. 4 shows a graph in which there are illustrated the two resonance peaks (shaft rotational frequency, respectively, over-roll frequency of the roll bodies) occurring during the frequency analysis.

The wideband recorded measuring signal of the strain gauge strip-full bridge is subjected to a frequency analysis for determination of the cage rotational speed, and best so in a real time analyzer. The result is illustrated in the graph according to FIG. 4. There occur two resonance peaks:

The lower-frequencied shaft rotational speed frequency $f_W$ is directly proportional to the 1st magnitude of the shaft rotational speed and is caused by the residual imbalance of the rotating components, whereby $f_K$ results from the over-roll frequency of the roll bodies. Thereby there is calculated the relative cage rotational speed as:

$$(n\ \text{Cage}/n\ \text{Shaft}) = f_K/(a \cdot f_W)$$

wherein $f_K$ = the roll body over-roll frequency (Hz)
$f_W$ = the shaft rotational frequency (Hz)
a = the number of the roll bodies (—).

Figure 5:
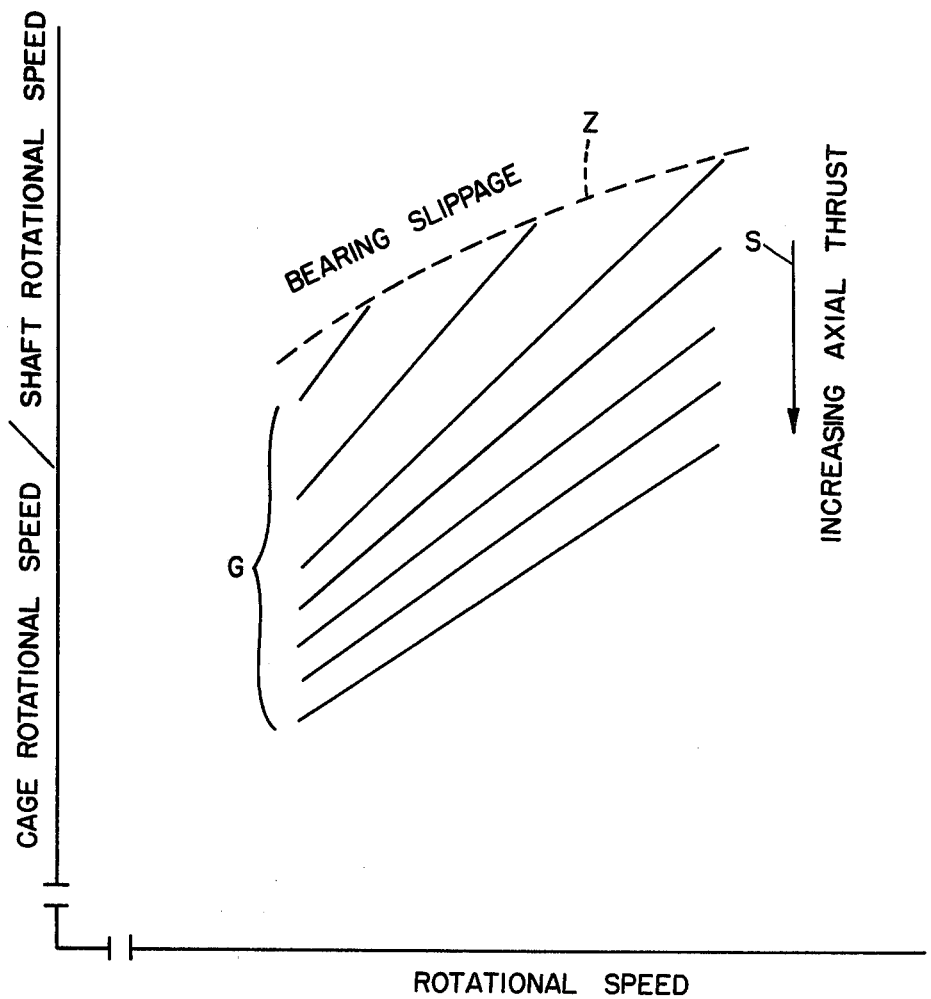
FIG. 5 shows a further graph in which the measured results are illustrated in greater detail.

According to the graph illustrated in FIG. 5, the relationship between the cage rotational speed and the shaft rotational speed represents a measure for the axial thrust (increasing axial thrust S).

Hereby, accordingly, the dependence of the relative cage rotational speed upon the shaft rotational speed, under the consideration of different axial thrusts S, there is generated a family of linear curves G arranged in a fan-shape, which increase with the rotational speed, and which is limited on the side of the lower axial thrust by the slip limit Z of the bearing.

What is claimed is:

1. A method for the determination of the axial thrust of roller bearings adapted therefor under extreme operating conditions, comprising obtaining the cage rotational speed from the frequency of the dynamic deflection at a weak point in the side of a stationary component of said roller bearing during operation thereof during roll body over-roll, determining the variation in the bearing cage rotational speed with the shaft rotational speed, and utilizing this value as the measuring magnitude for the axial thrust.

2. A method as claimed in claim 1, said cage rotational speed being determined through the intermediary of sensors.

3. A method as claimed in claim 2, said sensors comprising strain gauge strips.

* * * * *